T. A. RHODES.
EGG PACKING DEVICE.
APPLICATION FILED MAY 24, 1917.

1,249,197.    Patented Dec. 4, 1917.

Inventor
T. A. RHODES
By H. S. Kie
Attorney

UNITED STATES PATENT OFFICE.

THURMAN ALLEN RHODES, OF ALTAMONT, ILLINOIS.

EGG-PACKING DEVICE.

1,249,197.  Specification of Letters Patent.  Patented Dec. 4, 1917.

Application filed May 24, 1917. Serial No. 170,674.

*To all whom it may concern:*

Be it known that I, THURMAN ALLEN RHODES, a citizen of the United States, residing at Altamont, in the county of Effingham, State of Illinois, have invented a new and useful Egg-Packing Device; and I do hereby declare the following to be a full, clear, and exact description of the invention, such as will enable others skilled in the art to which it appertains to make and use the same.

The present invention relates to an egg packing device, and has for its object to provide a device of this character which embodies novel features of construction whereby the breakage of eggs within a crate will be confined to one particular layer and prevented from spreading throughout the entire crate, thereby resulting in a great saving to shippers and transportation companies.

Further objects of the invention are to provide an egg packing device in which the separators between the superposed filler cells are constructed to confine the liquid contents of any eggs which may break within any particular layer, thereby preventing the walls of underlying filler cells from being soaked and weakened so as to collapse under the weight superposed thereon, with the result that the eggs themselves are crushed by the superposed weight, thereby spreading the breakage throughout the entire crate with the result that there is much unnecessary loss. With the ordinary flat separator boards which are ordinarily interposed between the filler cells, the liquid contents of any eggs which may break will either soak through the board or flow around the edges thereof, resulting in either instance in soaking underlying filler cells to such an extent that portions thereof collapse and cause the breakage of additional eggs, this being repeated throughout the full depth of the crate until in frequent instances many eggs are broken. This is overcome in the present instance by constructing the separators in the form of shallow pans which may be paraffined or suitably waterproofed so as to confine the liquid contents of any eggs which may break to any particular layer and thereby prevent this breakage from spreading throughout the entire crate in the manner above described.

With this and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Corresponding and like parts are referred to in the following description and indicated in all the views of the drawings by the same reference characters.

Figure 1:
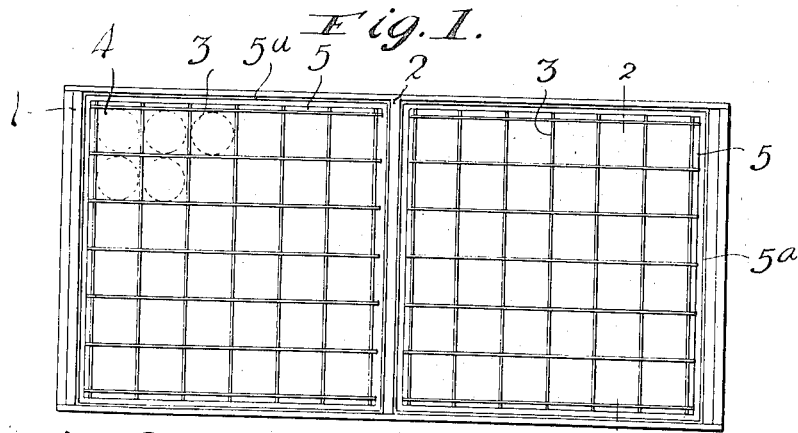
Figure 1 is a top plan view of a conventional egg crate provided with packing devices constructed in accordance with the invention, the cover of the crate and the upper separator pans being removed.

Specifically describing the present embodiment of the invention, the numeral 1 designates a crate which is of the conventional construction, being rectangular in shape and divided by a centrally disposed transverse partition 2 into two end compartments which are square in horizontal section and of standard dimensions so as to receive the usual filler cells 3 within which the eggs 4 are packed in horizontal layers. A shallow separator pan 5 is arranged under each of the filler cells 3 and an inverted pan 5 fitted over the uppermost cell. The sides 5$^a$ of the separator pans are flared outwardly so that the said pans will nest within each other when they are packed together, thereby making it easy to handle and ship the separator pans. The flared sides 5$^a$ also serve to frictionally engage the sides of the crate when they are assembled therein between the filler cells 3, thereby tending to take up looseness and prevent all unnecessary play of the eggs when the crate is handled. The flaring of the sides 5$^a$ has the further advantage of enabling the filler cells 3 to be easily centered properly within the pans when they are lowered into position within the crate, preparatory to filling them with eggs. It will thus be obvious that the edges of the separator pans will fit snugly against the sides of the crate and engage the filler cells in such a manner as to tend to hold them against lateral play. These pans 5 can be formed of any suitable material, although they will preferably be stamped from a single piece of medium weight board and treated with paraffin or some suitable substance to render them substantially waterproof.

With one of the separator pans 5 under each of the filler cells 3, and an inverted separator pan 5 over the uppermost set of filler cells, it will be understood that should one or more eggs in any layer become broken the liquid contents thereof will be effectively confined within the separator pan, thereby preventing underlying filler cells 3 from becoming soaked and weakened so as to collapse through the superposed weight directly upon the eggs. In this manner any breakage will be effectively confined to the particular layer of eggs in which it occurs and be prevented from spreading downwardly throughout the entire depth of the crate, increasing in magnitude as it spreads.

Figures 2, 3:
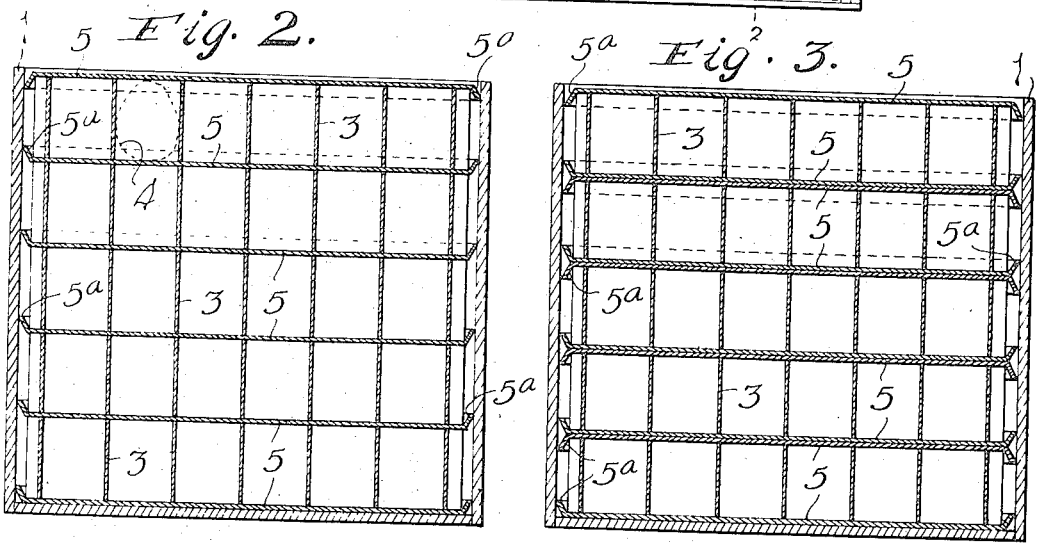
Fig. 2 is an enlarged transverse vertical sectional view taken on the line 2—2 of Fig. 1.
Fig. 3 is a similar view showing a modified arrangement of the separator pans.
Figure 4:
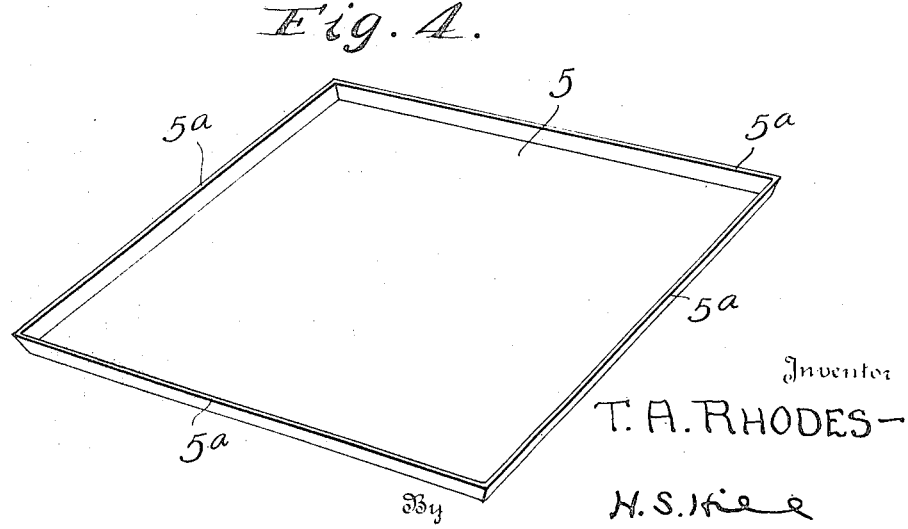
Fig. 4 is a detail perspective view of one of the separator pans.

In Fig. 3, an inverted separator pan 5 is arranged above each set of filler cells 3 as well as under the filler cells. This manner of packing the eggs would be desirable if the crates are liable to be inverted during transportation, or if the eggs are being packed for cold storage, where the egg crates are usually inverted at periodic intervals to prevent settling of the yolks. The separator pans will act exactly as previously described to confine any breakage which may occur to particular horizontal layers and prevent it from spreading downwardly, due to underlying filler cells being soaked and weakened by the liquid contents of the broken eggs. The use of these separator pans will also tend to make shippers more careful in the construction of their crates, since with these pans it is essential that the crates be constructed to receive them properly, and poorly constructed crates, which are frequently responsible for much breakage, would be difficult to use. It will also be obvious that with the use of these separator pans the breakage can be confined within the crate and there would be no leakage of broken eggs through the bottom or sides of the crate.

Having thus described the invention, what I claim as new and desire to secure by Letters Patent, is:—

1. The combination with a crate and a series of superposed filler cells arranged within the crate, of an independent pan shaped separator arranged under each of the filler cells and receiving the same, said pan shaped separator being formed with a continuous peripheral side so that it will collect and retain the liquid contents of any broken egg within the particular filler cell and prevent the underlying cells from becoming saturated therewith.

2. The combination with a crate and a series of superposed filler cells arranged within the crate, of an independent pan shaped separator arranged under each of the filler cells and receiving the same, said pan shaped separator being formed with a continuous peripheral side flange so as to collect and retain the liquid contents of any broken eggs within the particular filler cell and prevent the underlying cells from becoming saturated therewith, the side flanges of the separators being flared outwardly so that they will yieldably engage the walls of the crate and nest within each other.

3. The combination with a crate and a series of superposed filler cells arranged within the crate, of an independent pan shaped separator arranged under each of the cells and receiving the same, said separator being formed with a continuous peripheral side flange so as to collect and retain the liquid contents of any broken eggs within the filler cells and prevent underlying cells from becoming saturated therewith, the pan shaped separators being pressed from single sheets of waterproof board and having flared sides adapted to yieldably engage the walls of a crate.

In testimony whereof I have signed my name to this specification.

THURMAN ALLEN RHODES.